(12) United States Patent
Raphael

(10) Patent No.: US 8,523,213 B2
(45) Date of Patent: Sep. 3, 2013

(54) ORTHOPEDIC MOBILITY DEVICE

(76) Inventor: Thomas Raphael, Winchester, MA (US)

( * ) Notice: Subject to any disclaimer, the term of this patent is extended or adjusted under 35 U.S.C. 154(b) by 0 days.

(21) Appl. No.: 13/588,199

(22) Filed: Aug. 17, 2012

(65) Prior Publication Data

US 2013/0043666 A1  Feb. 21, 2013

Related U.S. Application Data

(60) Provisional application No. 61/525,338, filed on Aug. 19, 2011.

(51) Int. Cl.
*B62K 15/00* (2006.01)

(52) U.S. Cl.
USPC .......................................... 280/287; 280/278

(58) Field of Classification Search
USPC ................. 280/278, 287, 642, 647; 297/5, 297/6; 135/65, 66, 67, 74
See application file for complete search history.

(56) References Cited

U.S. PATENT DOCUMENTS

| | | | | |
|---|---|---|---|---|
| 93,751 | A * | 8/1869 | Sawhill | 280/242.1 |
| 2,201,440 | A * | 5/1940 | Letourneau et al. | 280/88 |
| 2,390,719 | A * | 12/1945 | Kurth | 280/234 |
| 2,533,728 | A * | 12/1950 | Gedat et al. | 280/233 |
| 2,619,364 | A * | 11/1952 | Carson | 280/287 |
| 2,823,367 | A * | 2/1958 | Huron | 180/283 |
| 2,995,384 | A * | 8/1961 | Rich | 280/269 |
| 3,429,584 | A * | 2/1969 | Hendricks | 280/261 |
| 3,485,508 | A * | 12/1969 | Hudnall | 280/234 |
| 3,905,618 | A * | 9/1975 | Miranda | 280/278 |
| 4,068,857 | A * | 1/1978 | Karlsson | 280/259 |
| 4,079,957 | A | 3/1978 | Blease | |
| 4,168,846 | A | 9/1979 | Carren | |
| 4,203,612 | A | 5/1980 | Felkema | |
| 4,457,529 | A | 7/1984 | Shamie et al. | |
| 4,460,192 | A | 7/1984 | Takamiya et al. | |
| 4,911,458 | A | 3/1990 | Lin et al. | |
| 4,972,595 | A * | 11/1990 | Shimamura et al. | 33/366.23 |
| 5,145,196 | A | 9/1992 | Langkamp | |
| D338,433 | S * | 8/1993 | Crooks, Sr. | D12/112 |
| 5,532,672 | A * | 7/1996 | Plazarin | 340/440 |
| 5,568,934 | A | 10/1996 | Niemeyer | |
| 5,765,290 | A * | 6/1998 | Rank et al. | 33/365 |
| 5,777,290 | A * | 7/1998 | Tzanev | 200/61.52 |
| 5,836,602 | A | 11/1998 | Wang | |
| 5,848,955 | A * | 12/1998 | Gooch et al. | 482/57 |

(Continued)

FOREIGN PATENT DOCUMENTS

CN  201597688 U  * 10/2010

OTHER PUBLICATIONS

Gentlemen, Amelia; "The trouble with mobility scooters"; The Guardian, May 2, 2012; (http://www.guardian.co.uk/society/2012/may/02/trouble-with-mobility-scooters/print) Jul. 9, 2012.

*Primary Examiner* — Joseph Rocca
*Assistant Examiner* — Daniel Yeagley

(57) ABSTRACT

An adult scale three-wheeled device facilitates movement for mobility challenged persons. The device is foot propelled while seated either through walking while seated or pedaling. The device is provided with a limited footprint for navigating confined areas while the individual is seated in a substantially standing position, with the pedals being repositionable so as to allow unobstructed walking while remaining seated. A lockable braking system prevents one or more wheels from turning. The device is collapsible for storage.

10 Claims, 5 Drawing Sheets

(56) References Cited

U.S. PATENT DOCUMENTS

| | | | |
|---|---|---|---|
| 5,904,363 A | 5/1999 | Li | |
| 5,924,713 A | 7/1999 | Li | |
| 6,034,594 A * | 3/2000 | Gray | 340/440 |
| 6,036,220 A | 3/2000 | Zhen | |
| 6,152,473 A | 11/2000 | Shih | |
| 6,268,794 B1 * | 7/2001 | Tzanev | 340/475 |
| 6,279,935 B1 | 8/2001 | Wagner | |
| 6,419,254 B1 * | 7/2002 | Langen | 280/260 |
| 6,517,093 B2 | 2/2003 | Feng | |
| 6,575,486 B2 * | 6/2003 | Ma | 280/287 |
| 6,609,723 B2 | 8/2003 | Chuang | |
| 6,685,206 B1 | 2/2004 | Blake | |
| 6,726,233 B1 | 4/2004 | Li | |
| 6,935,649 B2 * | 8/2005 | Lim | 280/278 |
| 6,966,572 B2 * | 11/2005 | Michelau et al. | 280/287 |
| 7,059,621 B2 | 6/2006 | Di Blasi et al. | |
| 7,159,882 B2 | 1/2007 | Buhrman | |
| 7,300,066 B2 | 11/2007 | Kettler et al. | |
| 7,306,249 B2 | 12/2007 | Kwok et al. | |
| D621,304 S * | 8/2010 | Jessie, Jr. | D12/112 |
| 7,926,828 B2 * | 4/2011 | Merchant | 280/282 |
| 7,938,413 B2 * | 5/2011 | Anderson | 280/87.021 |
| 2003/0141695 A1 | 7/2003 | Chen | |
| 2004/0012169 A1 | 1/2004 | Chen | |
| 2006/0244231 A1 * | 11/2006 | Rogers | 280/87.051 |
| 2007/0052189 A1 * | 3/2007 | Golias | 280/87.021 |
| 2008/0185812 A1 | 8/2008 | Liu | |
| 2008/0277901 A1 * | 11/2008 | Catelli et al. | 280/287 |
| 2008/0284125 A1 * | 11/2008 | Ramm et al. | 280/263 |
| 2008/0303243 A1 | 12/2008 | Ying | |
| 2010/0066054 A1 | 3/2010 | Chen | |
| 2010/0148467 A1 | 6/2010 | Hoerdum et al. | |
| 2010/0225088 A1 * | 9/2010 | Wernli | 280/266 |
| 2011/0181014 A1 * | 7/2011 | Ryan et al. | 280/263 |

* cited by examiner

ORTHOPEDIC MOBILITY DEVICE

RELATED APPLICATION

This invention claims the benefit of U.S. Provisional Patent Application Ser. No. 61/525,338, entitled "A foldable adult tricycle for mobility, exercise and rest support for those with joint problems", filed on Aug. 19, 2011, the contents of which are incorporated herein by reference in their entirety for all purposes.

BACKGROUND

1. Technical Field

This invention relates to the field of adult mobility devices. A field that includes devices such as wheelchairs and strollers designed to provide a physical assist to individuals moving from one location to another.

2. Background Information

It is well recognized that there is a societal need for devices that provide a physical assist to human movement. The earliest known human riddle queries what creature moves on three legs in the evening. The answer to the Sphinx's riddle is man and the third leg: a cane.

Whether as a result of age, disability or disease many people find a need for assistance in moving from one location to another. Numerous devices have been designed to address this need: from the simple cane or walking stick to motorized wheelchairs.

The need for mobility assistance is specific depending on the limitations of the individual. Consequently the solution must be specifically tailored to the individual circumstances it seeks to address. A wheelchair is inappropriate for someone who requires a cane, and a cane is inappropriate for someone who requires a wheelchair.

Walkers have become a common solution for people who require more support than a single point support, such as a cane, can provide but who are still mobile enough to walk. Additionally there is a physical and psychological benefit to maintaining physical exercise and independence. However some people, because of their physical condition, require more support than that provided by walker while still requiring less than that provided by a wheelchair. Many people who are effected by joint problems (such as problems with the back, hip, knee or foot), heart limitations, or who tire easily may have the use of their legs but due to discomfort or energy level require frequent or constant support to relieve parts of their body from carrying their full weight. There is therefore a need for a device that will substantially support a person's weight, and at the same time provide them with the capacity to propel themselves with their legs as well as their arms. A device such as a walker provides stability but little weight support. A wheelchair provides substantial physical support but provides little ability to propel oneself with their legs. This application presents an inventive solution that addresses this societal need.

SUMMARY

Tricycles traditionally have found extensive use as a children's toy. They are designed low to the ground and with relatively widely splayed rear wheels. This provides a low center of gravity and great stability. However the design that benefits a child proves unworkable for an adult, particularly inside a residence, due to the dimensions of an adult scaled version. It is also unworkable for someone who has mobility problems because of its low seat position.

One aspect of the present invention provides a three-wheeled device (tricycle) designed to provide improved mobility for people who are physically challenged through some condition such as age, infirmity, disability or disease. The adult sized three-wheel device is designed to support a seated adult in a substantially standing position while maintaining a limited footprint. The "footprint" is defined as the two dimensional surface area covered by device and defined at its outer boundary by the points where the device contacts the surface (such as a floor). A "limited footprint" in the context of this application is defined as a footprint restricted in size by a fixed ratio.

In another aspect of the invention the tricycle provides pedals that may be used to propel the tricycle. These pedals may be repositionable or removable so as not to interfere with the user walking the device. "Walking the device" refers to moving the vehicle by using the feet to exert a force directly against the ground while remaining seated, causing the device to move.

In another aspect of the invention the tricycle is collapsible for convenience of storage or transport. The device may also incorporate parts such as the seat, handlebars, pedals, and wheels, which may be adjusted or removed. This provides for additional storage flexibility by disassembly as well as providing for the use of interchangeable parts for different operating situations.

DETAILED DESCRIPTION

In the following detailed description, reference is made to the accompanying drawings that form a part hereof, and in which is shown by way of illustration, specific aspects in which the invention may be practiced. These aspects are described in sufficient detail to enable those skilled in the art to practice the invention, and it is to be understood that other aspects may be utilized. It is also to be understood that structural, procedural and system changes may be made without departing from the spirit and scope of the present invention. In addition, well-known structures and techniques have not been shown in detail in order not to obscure the understanding of this description. The following detailed description is, therefore, not to be taken in a limiting sense, and the scope of the present invention is defined by the appended claims and their equivalents.

General Overview

Figure 1:
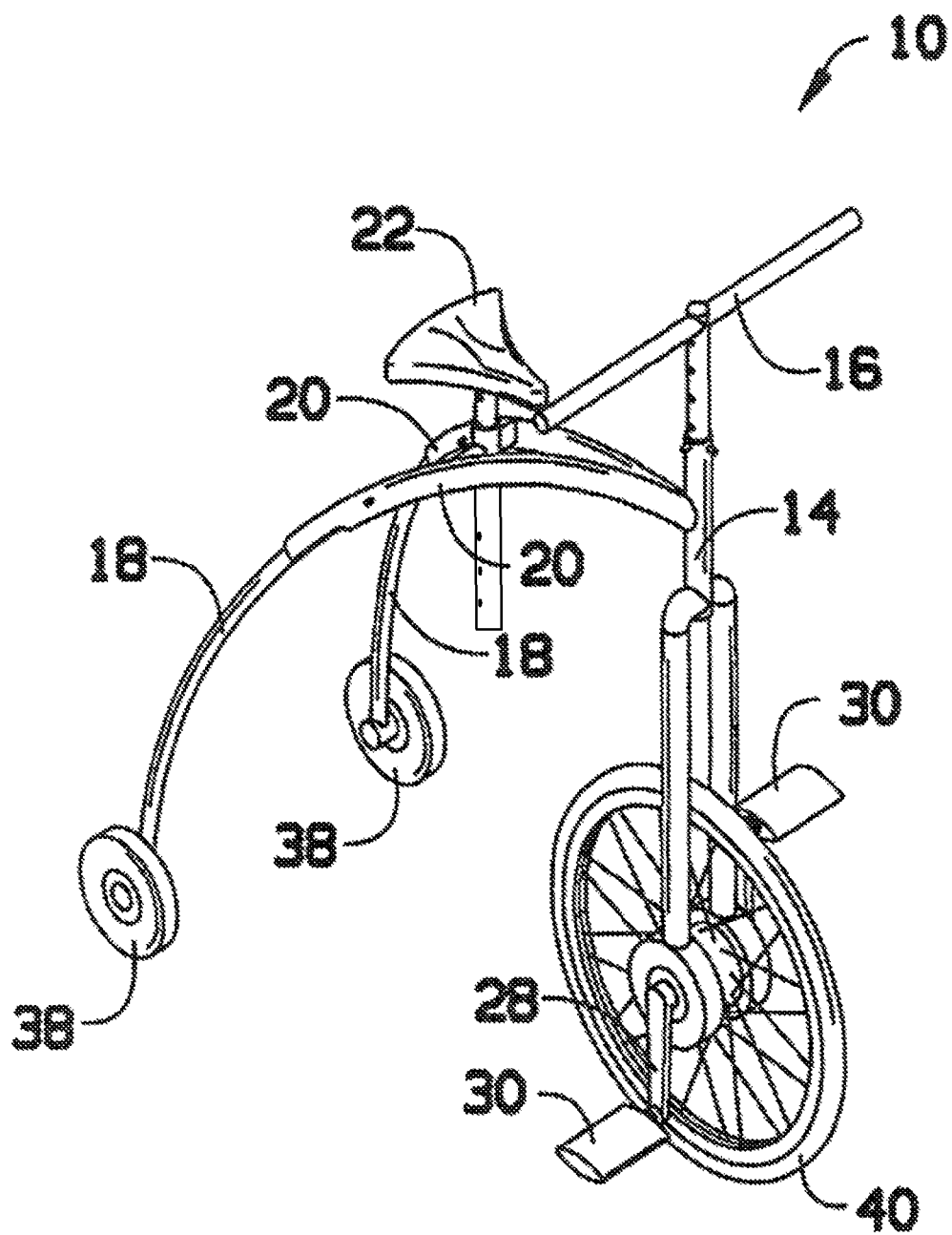
FIG. 1 is a perspective view of one aspect of the present invention.

Aspects of the present invention include an adult tricycle 10 as in FIG. 1 comprising a front frame 14 that is connected to a wheel 40. The wheel 40 is connected to a pedal 30 on each side of the wheel 40 by a connecting bars 28. This pedal wheel assembly attached to the frame 14 allows the vehicle to be propelled by applying pressure to pedals 30 resulting in torque on the connecting bars 28 which rotate the wheel 40. The steering element 16 is connected to the wheel assembly so that rotation of the steering element 16 causes a rotational force to be applied perpendicular to the axis of the wheel 40 causing a change in direction of the vehicle's 10 movement.

The seat 22 is supported by a seat-supporting element 20 that couples the front frame 14 to the rear wheel-connecting elements 18. These rear wheel-connecting elements 18 are in turn supported by the rear wheels 38. It should be noted that, although this aspect represents the seat-supporting element 20 as connecting to two separate wheel-connecting elements 18, this is not to be viewed as a design restriction. In another aspect the wheel-connecting elements 18 may be connected to a rear frame, the rear frame then connecting to the seat-supporting element.

Figure 2:
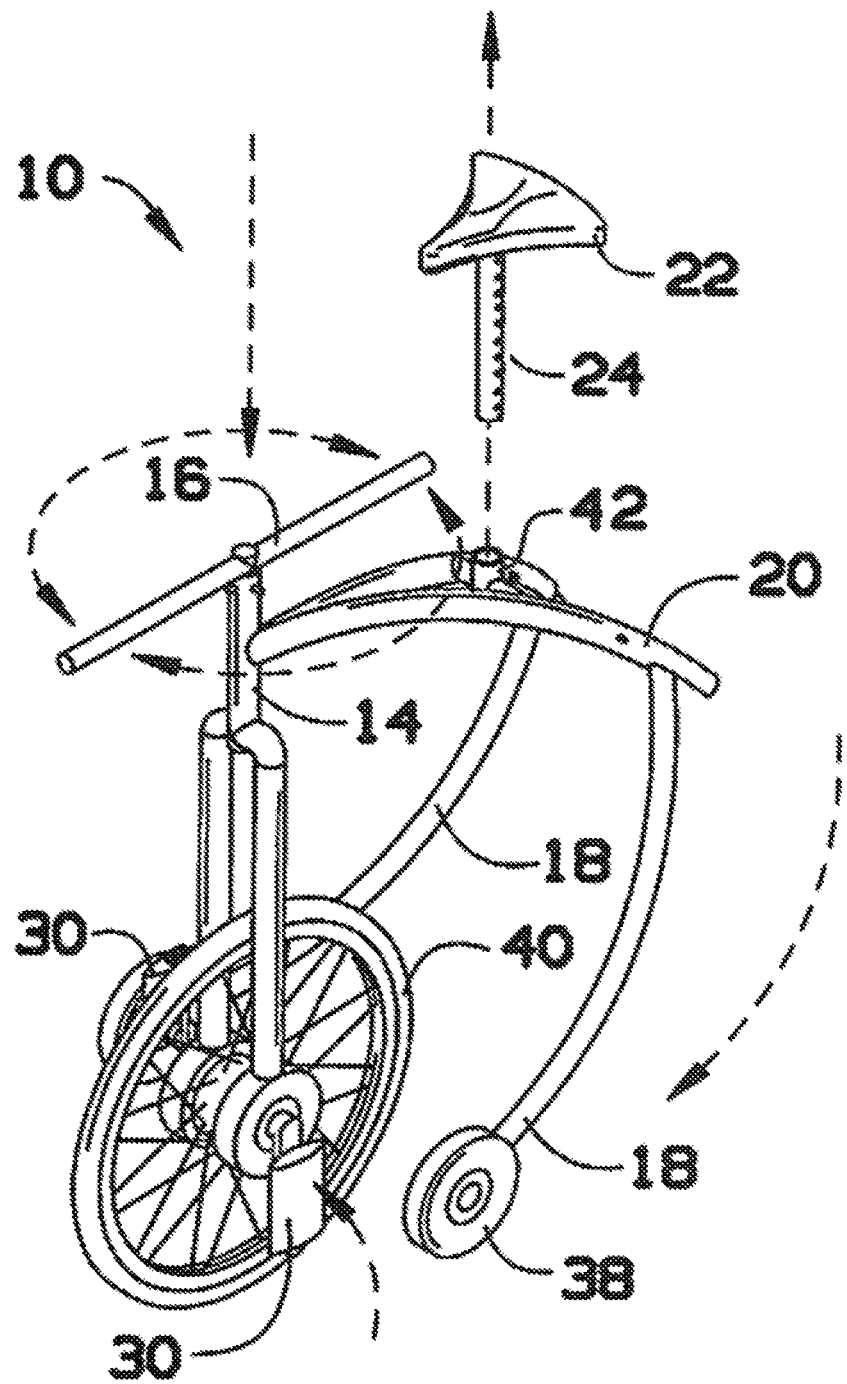
FIG. 2 is a perspective view of one aspect of the present invention manipulated for easy storage.

As seen in FIG. 2, in one aspect of the invention the vehicle 10 is collapsible and includes easily removable parts. In this aspect the connection between the rear wheel-connecting elements 18 and the seat-supporting element 20 are hinged allowing the rear wheels 38 and wheel-supporting elements to rotate downward and inward relative to the seat-supporting element 20 so that the distance from the rear wheels 38 and the front wheel 40 is reduced, but also the distance between the two rear wheels 38 is reduced, when in the collapsed position. It is also shown in this aspect that a seat-supporting post 24 is removable from a seat supporting sleeve 42, the sleeve 42 being a part of, or integrally coupled to, the seat-supporting element 20. Furthermore the pedals 30 may be folded inwards (see FIG. 3 description to follow). The steering element 16 may also be uncoupled from the front frame 14 and moved independently (See FIG. 4 description to follow).

Figure 3:
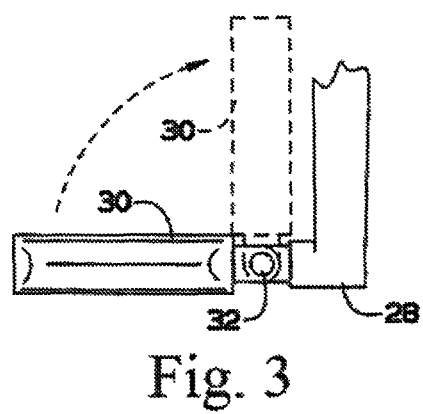
FIG. 3 is a schematic view of a pedal assembly.

As seen in FIG. 3, in one aspect of the invention the pedal assembly is shown. The connecting bars/rods 28 is attached to the pedal 30 by means of a hinge 32. This hinge allows for the pedal 30 to be folded inwardly into a position shown in phantom lines, i.e., so that the pedals lie within a plane substantially parallel to the plane of the wheel 40 as shown in FIG. 2. These folding pedals provide for easier storage. In addition, the pedals 30 may be maintained in the folded position to permit a user to walk the vehicle without the pedals obstructing the motion of the user's feet.

Figure 4:
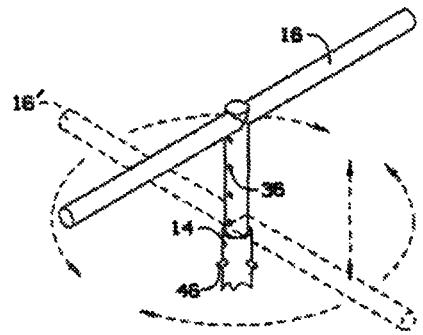
FIG. 4 is a perspective view of the steering element with hidden lines representing alternate positioning.

As seen in FIG. 4, in one aspect of the invention the steering element 16 is shown. In this aspect, the steering element includes a substantially horizontal bar and a vertical bar configured for slidable receipt within a sleeve disposed at the top of the front frame 14. Holes 36 may be provided so that removable pins 46 may be inserted or removed to rigidly couple or uncouple the steering element 16 from the front frame 14 allowing for ease of storage or interchangeable steering elements. It should be recognized that the flat steering element 16 is merely exemplary, and that any number of handlebar configurations known to those skilled in the art of bicycle fabrication, may be used without departing from the scope of the present invention. In addition, the steering element may be folded backwards or downwards for ease of storage, such as shown in phantom at 16' in FIG. 4.

Figure 5:
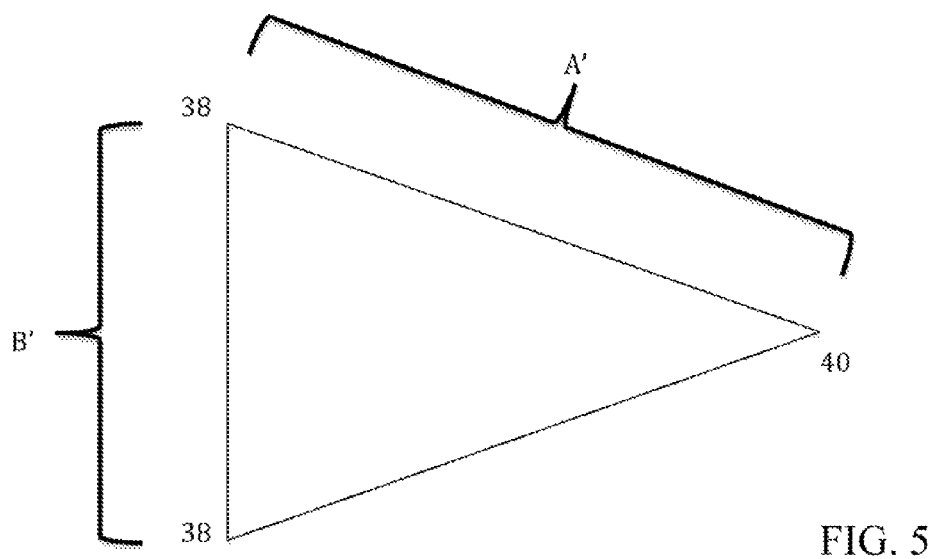
FIG. 5 is a top schematic view of a footprint created by the surface contact points of three wheels.

As seen in FIG. 5, a footprint of device 10 is defined by lines connecting the surface contact points of the front wheel 40 and two rear wheels 38 when in the deployed configuration of FIG. 1. The distance A' between the front wheel 40 and a rear wheel 38 is shown as well as the distance B' between the two rear wheels 38.

Figure 6:
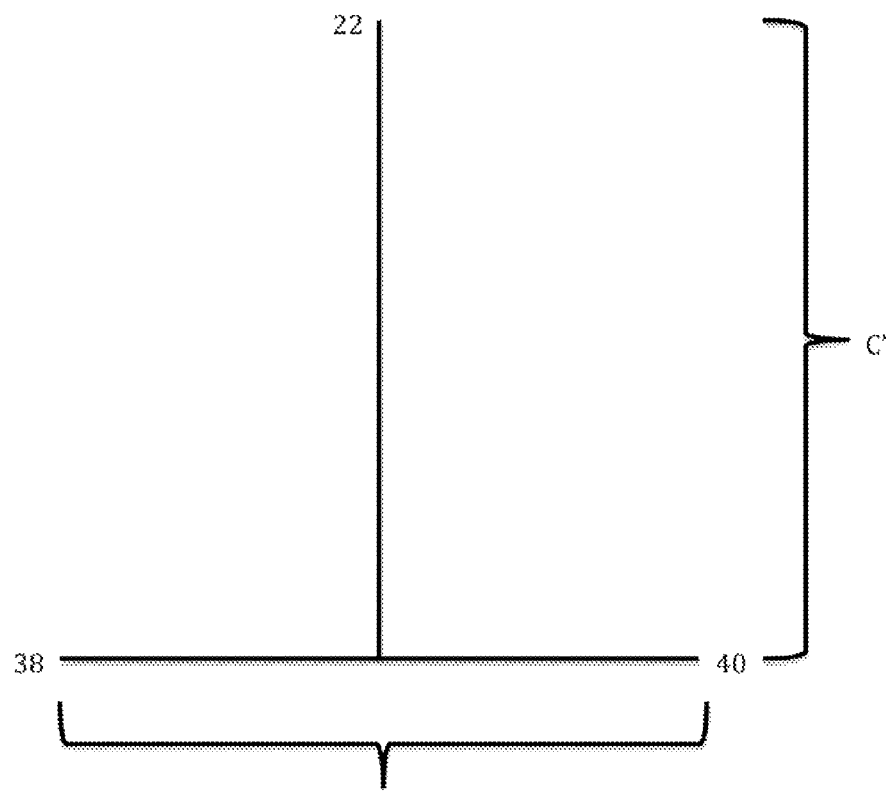
FIG. 6 is a side schematic view of seat height relative to the distance between two wheels.

As seen in FIG. 6, dimensions of device 10 as shown from a substantially elevational perspective include the relative height C' of seat 22 (FIG. 1) and the distance D' between the two wheels furthest apart from one another (i.e., between wheel 40 and a wheel 38 in the embodiment shown).

Figure 7:
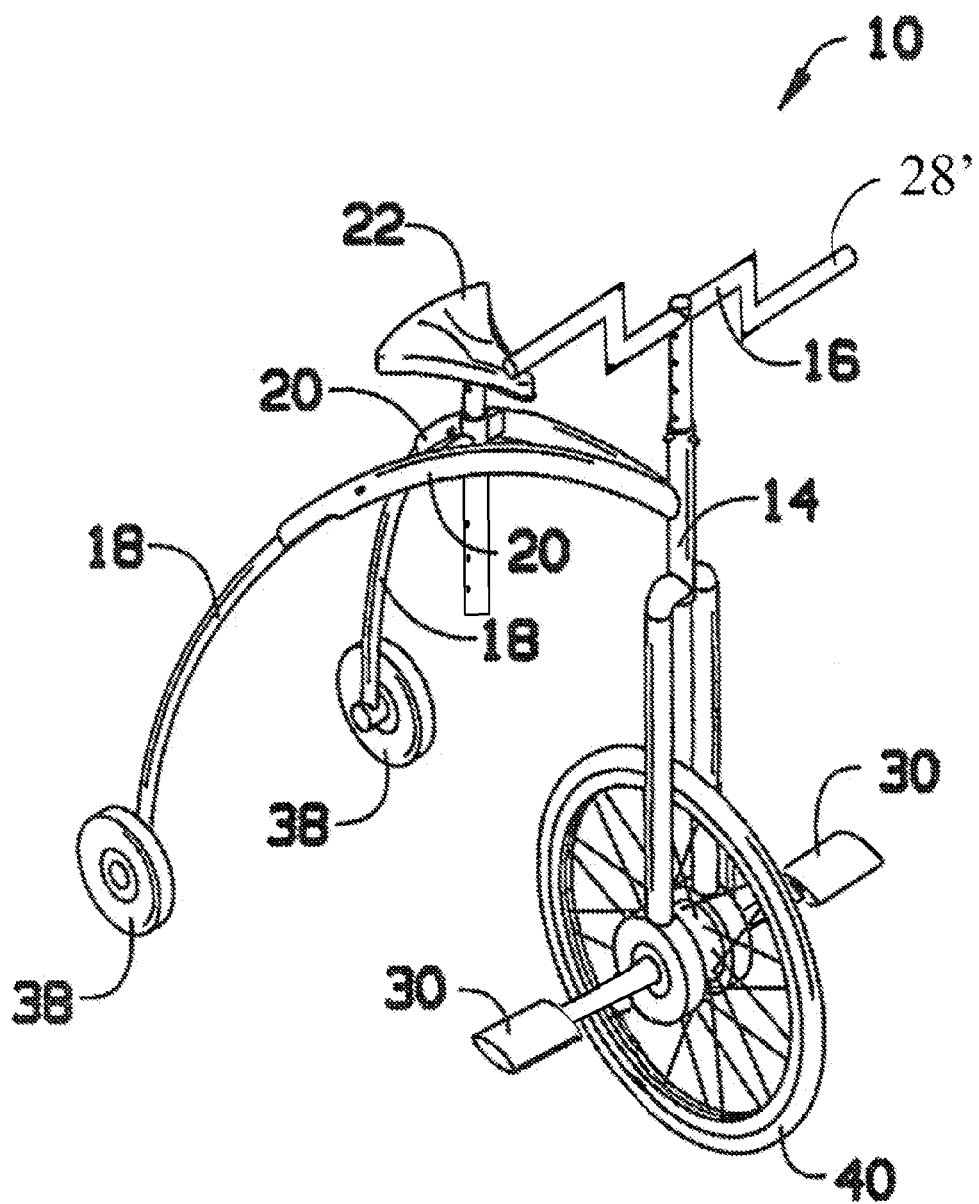
FIG. 7 is a perspective view of an alternative embodiment of the present invention.

As previously mentioned the embodiments described hereinabove should be viewed in an illustrative rather than limiting sense. Moreover, in a variation of the foregoing, the pedals may be entirely removable or an additional feature such as a clip, detent, or other fastener may be included to conveniently hold them in a folded position. Moreover, rather than being disposed on the front steering wheel 40 as shown, the pedals may be rotatably disposed on a bracket on the frame, and connected via conventional chain drive, belt, or drive shaft, to a (for example, rear) drive wheel. Still further, it is contemplated that the connecting bars 28 and pedals 30 may be eliminated and replaced by a hand crank located at the position of steering element 16, such as shown in FIG. 7 at 28', to effectively form a combined steering/drive element. The hand crank may be coupled via chain drive, belt, or drive shaft, etc., (not shown) to drive the wheel 40. Thus, the user may propel the vehicle by use of the hands rather than the feet. In this aspect a platform or bar may be employed to support the user's feet. This resting bar for example might include a horizontal bar extending from the axle of the front wheel.

In yet another aspect parts may be interchangeable to allow for customization for a particular user. Different styles and shapes of handlebars, seats, pedals and wheels may be employed. For example handlebars customized to provide additional resting support might be used. Wheels might be exchanged depending on the terrain (i.e. indoor use as opposed to outdoor use. The seat might be exchanged for one design or another depending on whether it is being used for exercise or relaxation.

In yet another aspect a brake system may be employed allowing for the slowing or stopping of the vehicle. Furthermore these brakes may be fixed in the locked position rendering the vehicle immobile and increasing its stability. The braking system may be connected to one or more wheels and may use various technologies such as cable driven mechanical systems or any alternative performing substantially the same function such as a remote electrical or motorized system. The brake may further be either a hand operated brake, a foot operated brake or any combination thereof.

In yet another aspect the arrangement of the wheels may be reconfigured. One example of this might be a reverse tricycle arrangement with two wheels in front of the seated user and one wheel behind. The device might also employ more than three wheels such as a quadricycle design utilizing four wheels. Additional wheels might be employed for added support.

The present invention thus provides a multi-wheeled mobility device for use by adults for whom movement is otherwise difficult. It provides a self-propelled vehicle that provides the added support of a seat and the stability of at least three wheels usable in various environments. Those environments may include, but are not limited to: malls, sidewalks, hallways and interior residential areas.

In particular aspects the vehicle has a limited footprint, e.g., an area defined by the ground-engaging contact points (or geometric centers) of its wheels. The size of this footprint may be restricted to an area and shape that will allow maneuvering in the interior residential floor spaces typically navigated by a walking adult. Walking in this context is generally defined as the normal unobstructed bipedal directional movement and turning of an individual.

In a particular aspect, the limited footprint may be defined in terms of an aspect ratio between the height C' of the seat 22 and the distance D' between the geometric centers of the two wheels located furthest from one another as shown in FIGS. 5-6. In FIG. 5 the distance A' is shown as greater than B' so in FIG. 6, for the purpose of determining the height to length ratio, the distance D' would correspond to the distance A' in FIG. 5. In an alternate aspect the distance B' might be longer than A' in which case B' would correspond to D' in FIG. 6. In particular aspects, the aspect ratio is at least 1:1, and may be as high as 2.5:1. In particular applications, the aspect ratio may be in a range of about 1.25:1 to 2:1.

This description of a limited footprint need not be construed to be limited to three wheels. In a further aspect more than three wheels may be employed, e.g., in which the aspect ratio is defined as the ratio of seat height to the distance between the geometric centers of the two wheels located furthest from one another.

In various other aspects numerous features may be incorporated into the vehicle. In yet another aspect the vehicle may comprise a noise-producing device such as a bell to alert people to the users presence. The vehicle may comprise a light for illumination or to notify people of the user's presence at night. The vehicle may also comprise an orientation sensitive mechanism to provide an alert if the vehicle tips beyond a preset threshold. The vehicle may also comprise a basket for transporting various personal items or groceries. A further feature may be a handle or push pad allowing a third party to assist the user up an incline or provide added stability by holding onto or pushing the vehicle.

The invention is not limited to the above aspects consequently various modifications may be made. Further various changes in form and detail may be made without departing from the scope of the invention.

The invention claimed is:

1. An orthopedic mobility device comprising:
   a front frame element having at least one front wheel rotatably mounted thereto;
   said front wheel communicably coupled by an elongated member to a steering element;
   said front frame element including a head tube connected to a rear frame element by a seat supporting element;
   said rear frame element having at least a left and a right rear wheel rotatably mounted thereto;
   said seat supporting element including a left seat support and a right seat support, the left and right seat supports extending in a splayed orientation from the head tube towards the rear frame element and terminating, respectively, at left and right hinges;
   a cross-bar extending between the left and right seat supports at a location between the head tube and the right hinges;
   the rear frame element including a left wheel supporting hinged coupled to the left hinge, and a right wheel support hinged coupled to the right hinge, wherein said at least left and right rear wheels are configured to rotate relative to the front frame element and fold into a final position closer to the front frame element than in an unfolded position;
   said seat supporting element supporting a seat that maintains an adult in a near standing position; and
   the front and rear wheels being positioned so as to create a limited footprint allowing maneuverability of said device indoors; and
   said limited footprint being defined by an aspect ratio of a seat height to a greatest distance between geometric centers of any two wheels, said aspect ratio being at least 1.1:1.

2. The orthopedic mobility device of claim 1, wherein said aspect ratio is within a range of at least 1.25:1 and up to 2:1.

3. The orthopedic mobility device of claim 1 wherein the device is a tricycle comprising one steering wheel and two non-steering wheels.

4. The orthopedic mobility device of claim 3 wherein at least one wheel is communicably coupled to pedals allowing a user to propel the device by pedaling.

5. The orthopedic mobility device of claim 4 wherein the pedals may be repositioned so as not to interfere with walking the device.

6. The orthopedic mobility device as of claim 5, wherein the device is foldable between a deployed and folded positions, wherein rear wheels are disposed closer to the front wheel and to each other in the folded position than in the deployed position.

7. The orthopedic mobility device of claim 6 where a part selected from a group consisting of pedals, seats, steering elements, and wheels is removable.

8. The orthopedic mobility device of claim 3 where the steering element comprises a hand crank communicably coupled with at least one wheel allowing a user to propel the device with hands.

9. The orthopedic mobility device of claim 8, further comprising a support for the user's feet extending from an axle of the front wheel.

10. The orthopedic mobility device of claim 1 where the footprint has a shape of an isosceles triangle with a base of 1.3 feet to 2 feet and a height of 1.3 feet to 2.5 feet.

* * * * *

UNITED STATES PATENT AND TRADEMARK OFFICE
CERTIFICATE OF CORRECTION

PATENT NO. : 8,523,213 B2  
APPLICATION NO. : 13/588199  
DATED : September 3, 2013  
INVENTOR(S) : Thomas Raphael Page 1 of 1

It is certified that error appears in the above-identified patent and that said Letters Patent is hereby corrected as shown below:

In the Claims  
Claim 1, Column 5, Line 45, after the words "and the" insert the following --left and--.  
Claim 1, Column 6, Line 1, the last word "-supporting-" should read --support--.  
Claim 1, Column 6, Line 2, the first word "-hinged-" should read --hingedly--.  
Claim 1, Column 6, Line 3, the second word "-hinged-" should read --hingedly--.

Signed and Sealed this  
Seventeenth Day of December, 2013

Margaret A. Focarino  
*Commissioner for Patents of the United States Patent and Trademark Office*